(12) United States Patent
Daitou

(10) Patent No.: US 7,663,059 B2
(45) Date of Patent: Feb. 16, 2010

(54) CAP AND MANUFACTURING METHOD OF THE CAP

(75) Inventor: Kouji Daitou, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 62 days.

(21) Appl. No.: 12/035,270

(22) Filed: Feb. 21, 2008

(65) Prior Publication Data

US 2009/0211809 A1    Aug. 27, 2009

(51) Int. Cl.
*H02G 15/02* (2006.01)
(52) U.S. Cl. .................. 174/77 R; 174/84 C
(58) Field of Classification Search .......... 174/74 R, 174/77 R, 84 C
See application file for complete search history.

(56) References Cited

U.S. PATENT DOCUMENTS 7,112,745 B2 * 9/2006 Hatori ...................... 174/71 R 2002/0050385 A1 * 5/2002 Murakami et al. ........ 174/74 R
2002/0189844 A1 * 12/2002 Fukushima et al. ....... 174/74 R
2006/0000632 A1 * 1/2006 Thompson et al. ........ 174/74 R

FOREIGN PATENT DOCUMENTS

JP        11-178142        7/1999

* cited by examiner

*Primary Examiner*—Chau N Nguyen
(74) *Attorney, Agent, or Firm*—Finnegan, Henderson, Farabow, Garrett & Dunner, L.L.P.

(57) ABSTRACT

A cap that covers an electric wire connecting portion in which respective conductive portions of a plurality of electric wires are interconnected is molded in such a manner that one end side of a tube having a tubular shape is hermetically sealed by welding treatment, and a tongue portion is formed by a stamping process on the other end side.

7 Claims, 9 Drawing Sheets

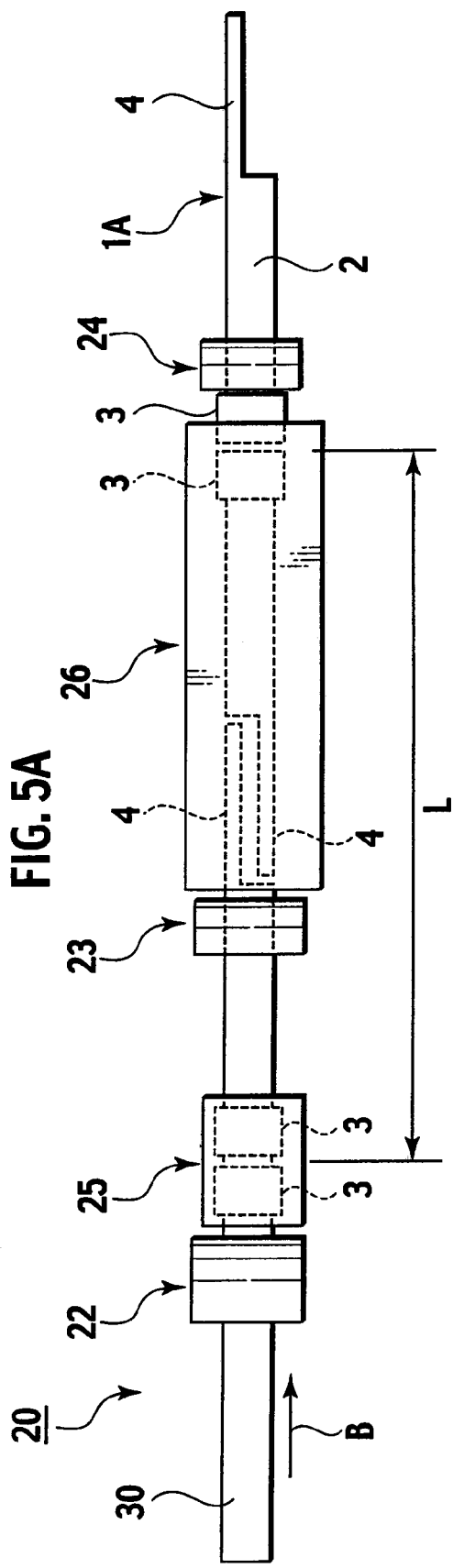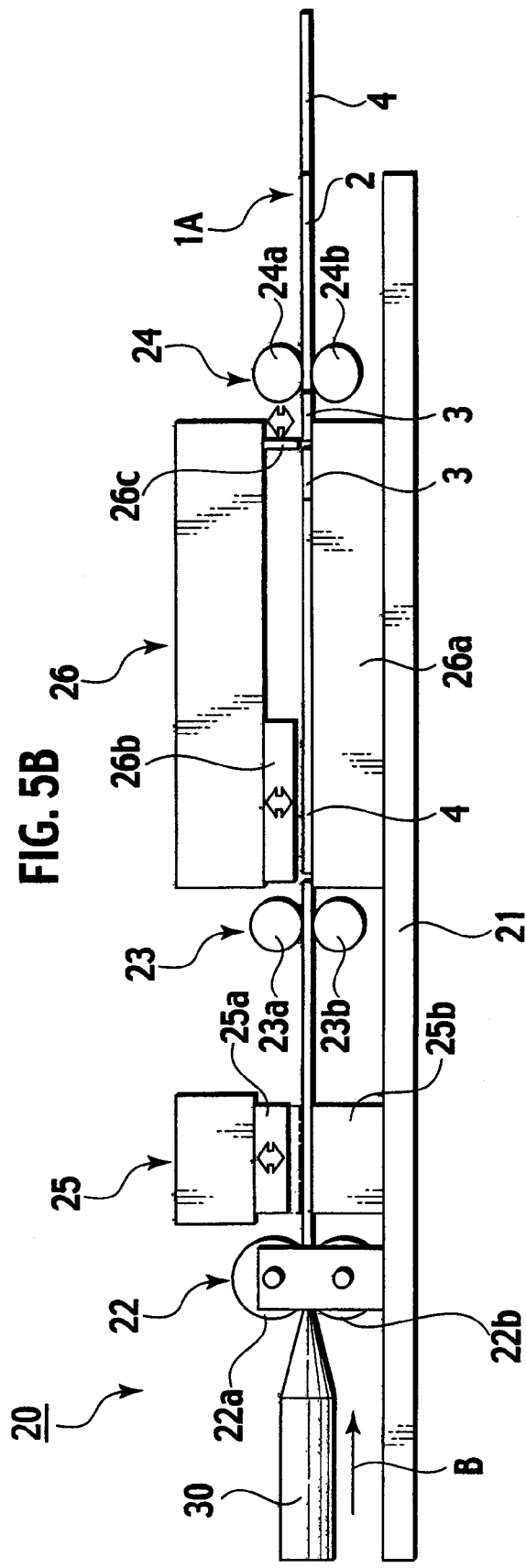

CAP AND MANUFACTURING METHOD OF THE CAP

BACKGROUND OF THE INVENTION

1. Field of the Invention

The present invention relates to a cap that covers an electric wire connecting portion in which respective conductive portions of a plurality of electric wires are interconnected, and relates to a manufacturing method of the cap.

2. Description of the Related Art

For example, in cabling of a wire harness, insulating outer sheaths of a plurality of electric wires are stripped, and exposed conductive portions are interconnected, whereby an electric wire connecting portion is formed. Moreover, a cap made of an insulating material is used in order to ensure insulating property, waterproof and the like of a spot of the electric wire connecting portion.

As this type of the conventional cap, one shown in FIGS. 1A and 1B and one shown in FIGS. 2A and 2B are disclosed in Japanese Patent Laid-Open Publication No. H11-178142 (published-in 1999). The cap 100 shown in FIGS. 1A and 1B is one formed by injection molding using a metal mold. The cap 100 is composed of: a cylinder 101 in which one end is closed; and a tongue portion 102 protruded from the other end of the cylinder 101.

In work to cover an electric wire connecting portion 105 of a plurality of electric wires W by using the cap 100, first, as shown in FIG. 1A, the electric wire connecting portion 105 of the plurality of wires W is inserted into the cylinder 101 of the cap 100. Next, as shown in FIG. 1B, the tongue portion 102 of the cap 100 is bound with the plurality of electric wires W by a tape 106, and this is the end of the work.

The cap 110 shown in FIGS. 2A and 2B is composed of: a heat-shrinkable tube 111 formed by extrusion molding, in which both ends are opened; and a hot melt layer 112 adhered onto an inner surface of the heat-shrinkable tube 111.

In work to cover the electric wire connecting portion 105 of the plurality of wires W by using the cap 100, first, as shown in FIG. 2A, the electric wire connecting portion 105 of the plurality of electric wires W is inserted into the heat-shrinkable tube 111. Next, as shown in FIG. 2B, the cap 110 is heated by a hot wind and the like. Then, the heat-shrinkable tube 111 shrinks by being heated, and in addition, the hot melt layer 112 is solidified by a temperature drop caused after such heating, and this is the end of the work.

SUMMARY OF THE INVENTION

The conventional cap 100 shown in FIGS. 1A and 1B has a problem that, since the cap 100 is formed by the injection molding using the metal mold, forming process cost thereof is high, resulting in that cost of the parts is high.

In the conventional cap 110 shown in FIGS. 2A and 2B, since the heat-shrinkable tube 111 is formed by the extrusion molding, forming process cost thereof is low. However, the cap 110 has a problem that the work to cover the electric wire connecting portion 105 is cumbersome since it is necessary to form the hot melt layer 112 on the inner surface of the hot-shrinkable tube 111, and to implement such heating treatment for the cap 110 concerned by the hot wind and the like.

The present invention has been made in order to solve the above-described problems. It is an object of the present invention to provide a cap in which the cost of the parts is low, and in addition, the work to cover the electric wire connecting portion is simple, and to provide a manufacturing method of the cap.

A first aspect of the present invention is a cap that covers an electric wire connecting portion in which respective conductive portions of a plurality of electric wires are interconnected, the cap comprising: a tube having a tubular shape; a first end hermetically sealed by welding treatment; and a second end on which a tongue portion is formed by a stamping process.

In accordance with such a configuration as described above, the welding treatment and cutting/stamping processes are implemented for the tube formed by the extrusion molding, thus making it possible to fabricate the cap. Therefore, in comparison with the cap formed by the injection molding using the metal mold, good productivity is brought, and cost of equipment is saved. Moreover, the electric wire connecting portion is inserted into the cap, and the tongue portion is bound with the plurality of electric wires by a tape, whereby the work to cover the electric wire connecting portion by the cap is completed. From the above, the cost of the parts is low, and in addition, the work to cover the electric wire connecting portion is simple.

In the above-described configuration, a configuration may be adopted, in which a plurality of the caps are fabricated from a long-length tube, the tongue portions of two caps fabricated adjacent to each other are set at positions opposed to each other along a longitudinal direction of the long-length tube, and both of the tongue portions set at the positions opposed to each other are formed by the stamping process.

In accordance with such a configuration as described above, a loss of a material of the plurality of caps is saved when the caps are fabricated from the long-length tube, and this contributes to reduction of the cost.

Moreover, in the above-described configuration, a configuration may be adopted, in which a protruded portion formed by the stamping process is provided on an end of the tongue portion.

In accordance with such a configuration as described above, when external force to pull out the cap from the electric wires is applied to the cap, the protruded portion of the tongue portion increases frictional force with the electric wires, and accordingly, the cap is not detached easily.

Moreover, in the above-described configuration, a configuration may be adopted, in which a protruded portion formed by heating treatment is provided on an end of the tongue portion.

In accordance with such a configuration as described above, similar functions/effects to those of the above are obtained.

Moreover, a second aspect of the present invention provides a method of manufacturing a cap, including: forming a hermetically sealed portion by implementing welding treatment for a long-length tube at a predetermined interval in a longitudinal direction thereof; cutting the long-length tube so that the hermetically sealed portion can be one end of the cap; and implementing a stamping process for the long-length tube in order to form a tongue portion on the other end side of the cut tube.

In accordance with such a configuration as described above, the plurality of caps can be continuously fabricated from the long-length tube. Moreover, as a raw material of the cap, the tube formed by the extrusion molding can be used. Furthermore, the welding treatment and the stamping process are implemented for the tube, whereby each cap is fabricated. Accordingly, in comparison with the cap formed by the injection molding using the metal mold, good productivity is brought, and the cost of the equipment is saved. Moreover, the electric wire connecting portion is inserted into the cap, and the tongue portion is bound with the plurality of electric wires by the tape, whereby the work to cover the electric wire connecting portion by the cap is completed. From the above, the cap can be mass-produced, in which the cost of the parts is low, and in addition, the work to cover the electric wire connecting portion is simple.

Moreover, in the above-described configuration, a configuration may be adopted, in which the tongue portions of two caps fabricated adjacent to each other from the long-length tube are set at positions opposed to each other along a longitudinal direction of the long-length tube, in the welding step, two spots of the long-length tube, the spots being close to each other, are welded simultaneously, and the hermetically sealed portions are formed in the two spots close to each other, and in the cutting/stamping process step, a spot between the hermetically sealed portions in the two spots close to each other is cut, and the two tongue portions set at the positions opposed to each other are stamped.

In accordance with such a configuration as described above, the two caps can be fabricated simultaneously by the welding treatment and the cutting/stamping process, each of which is implemented once. Accordingly, this leads to further enhancement of the productivity. Moreover, the loss of the material of the plurality of caps is saved when the caps are fabricated from the long-length tube, and this contributes to the reduction of the cost.

Moreover, in the above-described configuration, a configuration may be adopted, in which the tongue portions of two caps fabricated adjacent to each other from the long-length tube are set at positions opposed to each other along a longitudinal direction of the long-length tube, in the welding process, a predetermined spot of the long-length tube is welded to form the hermetically sealed portion, in the cutting process, a center portion of the hermetically sealed portion is cut, and in the stamping process, two tongue portions set at positions opposed to each other are stamped.

In accordance with such a configuration as described above, similar functions/effects to those of the above are obtained.

Moreover, in the above-described configuration, a configuration may be adopted, in which the welding treatment, the cutting process and stamping process are performed simultaneously.

In accordance with such a configuration as described above, in addition to the above-described effects, further enhancement of the productivity is achieved.

BRIEF DESCRIPTION OF THE DRAWINGS

FIG. 3A is a front view of a cap; and FIG. 3B is a cross-sectional view of FIG. 3A, which is taken along a line 3B-3B.

FIGS. 5A and 5B show the first embodiment of the present invention: FIG. 5A is a schematic plan view of a cap manufacturing apparatus; and FIG. 5B is a schematic front view of the cap manufacturing apparatus.

FIG. 6A is a plan view showing a spot of a long-length tube, which is subjected to welding treatment; and FIG. 6B is a cross-sectional view of FIG. 6A, which is taken along a line 6B-6B.

FIG. 7A is a plan view showing a spot of the long-length tube, which is subjected to the welding treatment; and FIG. 7B is a cross-sectional view of FIG. 7A, which is taken along a line 7B-7B.

DETAILED DESCRIPTION OF THE PREFERRED EMBODIMENTS

A description will be made below of embodiments of the present invention based on the drawings.

Figure 1A:
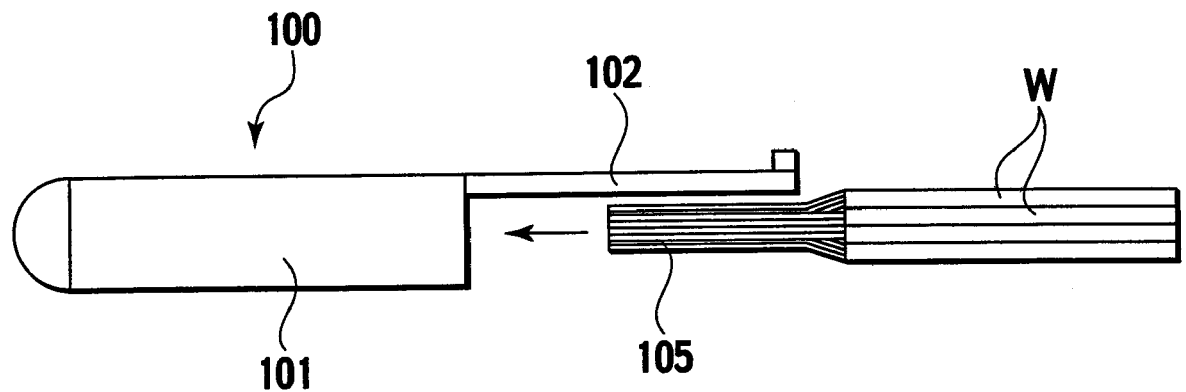
FIGS. 1A and 1B are front views explaining respective works to cover an electric wire connecting portion by using a cap in a conventional example.
Figure 1B:
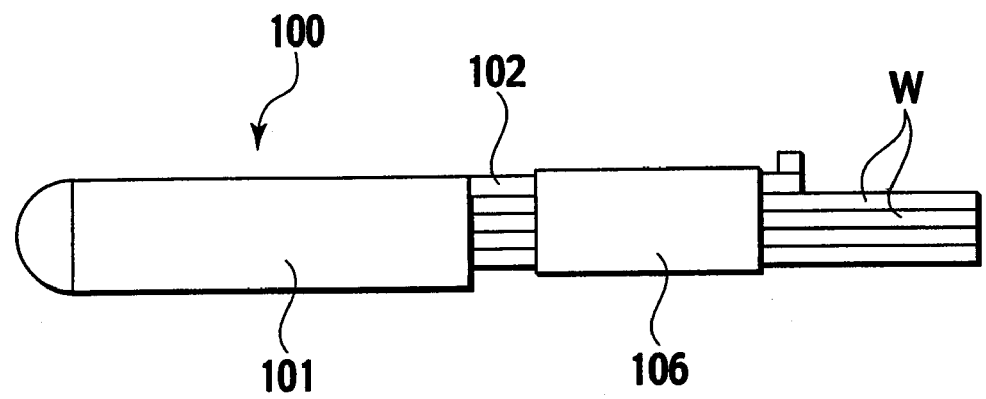
Figure 2A:
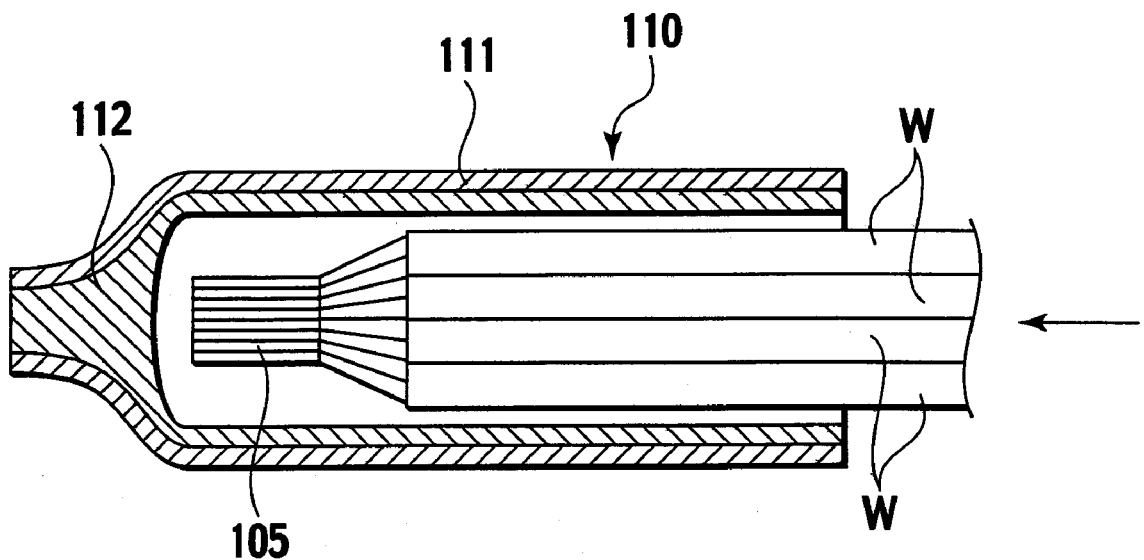
FIGS. 2A and 2B are front views explaining respective works to cover the electric wire connecting portion by using the cap in another conventional example.
Figure 2B:
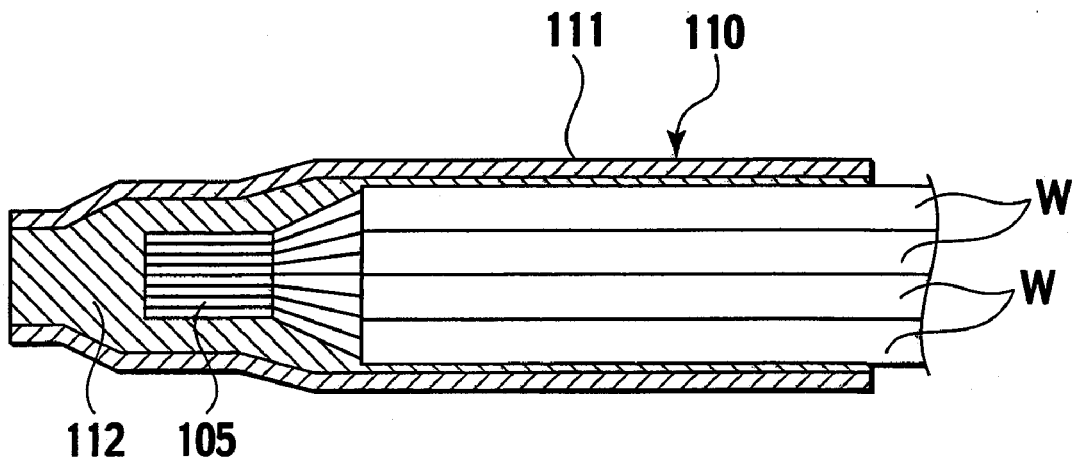
Figure 3A:
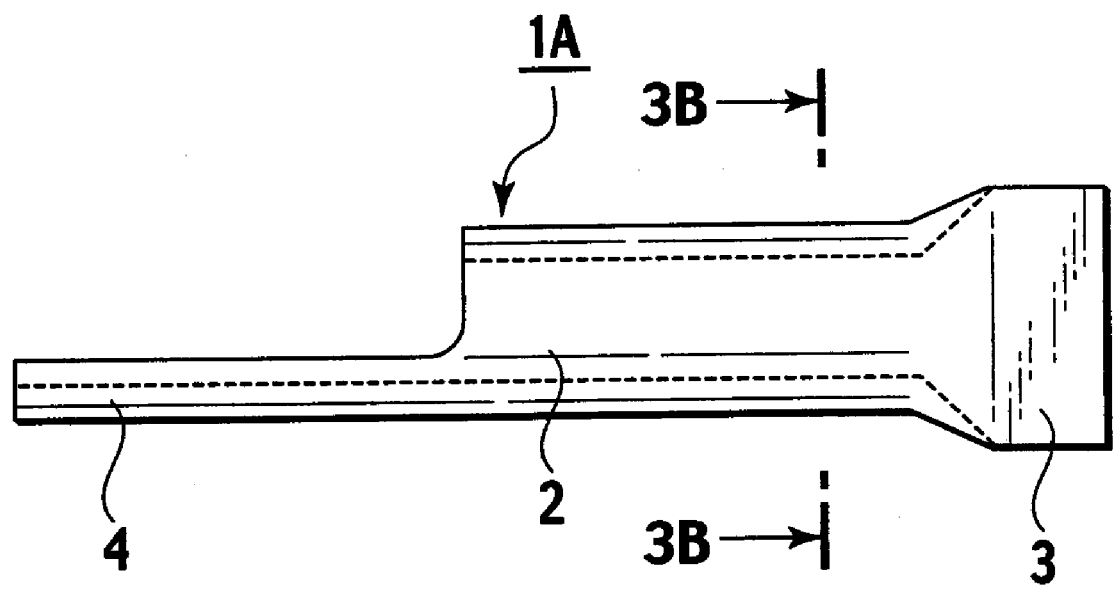
FIGS. 3A and 3B show a first embodiment of the present invention.
Figure 3B:
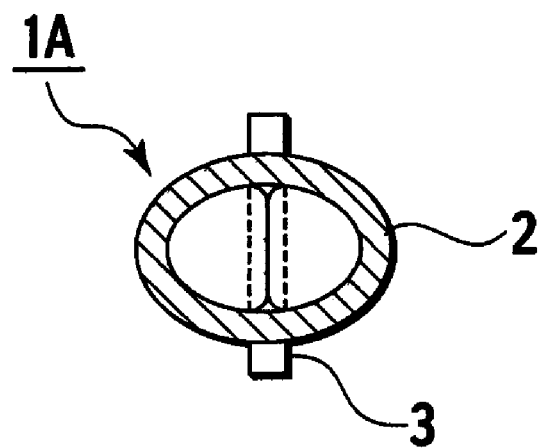

As shown in FIGS. 3A and 3B, a cap 1A is formed of a tube 2, in which one end side is made as a hermetically sealed portion 3 by welding treatment, and a tongue portion 4 is formed by a stamping process on the other end side. The tube 2 is one obtained by forming a material such as vinyl chloride, polypropylene (PP) and elastomer, which is capable of being subjected to extrusion molding, into a cylindrical shape by the extrusion molding. The cap 1A is fabricated by using the tube 2 described above. A manufacturing method of the cap 1A will be described below in detail.

Figure 4A:
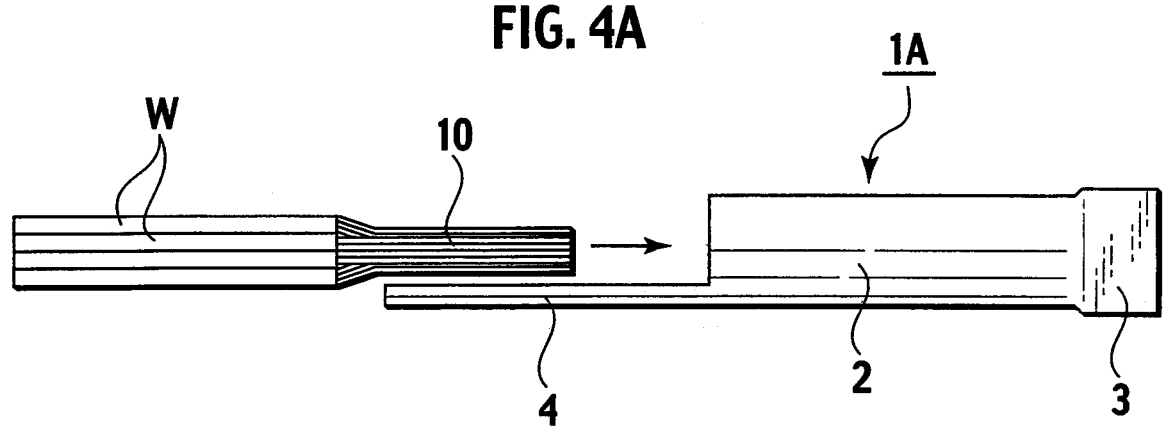
FIGS. 4A and 4B are front views explaining respective works to cover the electric wire connecting portion by using the cap, showing the first embodiment of the present invention.
Figure 4B:
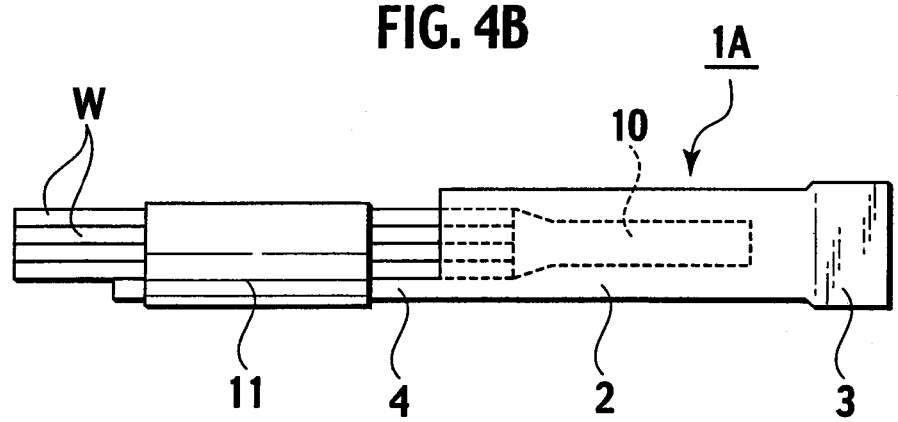

Next, a description will be made of work to cover an electric wire connecting portion 10 of a plurality of electric wires W by using the cap 1A. As shown in FIG. 4A, the electric wire connecting portion 10 of the plurality of electric wires W is inserted into the tube 2 from the other end side thereof. Then, as shown in FIG. 4B, the tongue portion 4 of the cap 1A is bound with the plurality of electric wires W by a tape 11, and this is the end of the work.

Next, a description will be made of a cap manufacturing apparatus 20. As shown in FIGS. 5A and 5B, the cap manufacturing apparatus 20 includes: first to third tube feeding units 22 to 24 arranged on a base 21 at an interval in a conveying direction B; a tube welding unit 25 disposed on the base 21 and immediately downstream of the first tube feeding unit 22; and a tube cutting/stamping unit 26 disposed on the base 21 and between the second and third tube feeding units 23 and 24.

The first to third tube feeding units 22 to 24 include a pair of feed rollers 22a and 22b, a pair of feed rollers 23a and 23b, and a pair of feed rollers 24a and 24b, respectively, in each pair of which the rollers are arranged up and down. A long-length tube 30 is disposed between the pair of feed rollers 22a and 22b, the pair of feed rollers 23a and 23b, and the pair of feed rollers 24a and 24b. The long-length tube 30 is conveyed at an interval of a predetermined pitch L by rotating the pairs of feed rollers 22a and 22b, 23a and 23b, and 24a and 24b.

Here, a plurality of the caps 1A are continuously fabricated from the long-length tube 30, and the tongue portions 4 and 4 of two caps 1A and 1A fabricated continuously are set at positions opposed to each other along a longitudinal direction of the long-length tube 30. In this case, the predetermined pitch L has a length required to fabricate these two caps 1A and 1A.

Figure 6A:
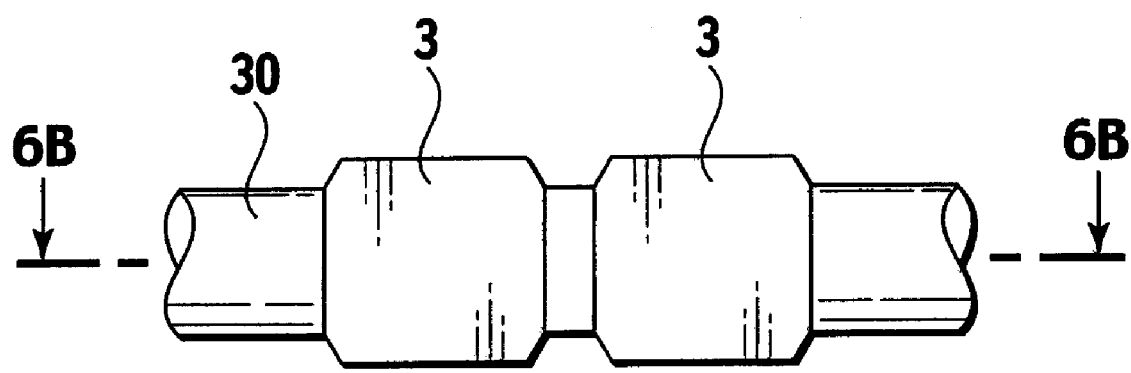
FIGS. 6A and 6B show the first embodiment of the present invention.
Figure 6B:
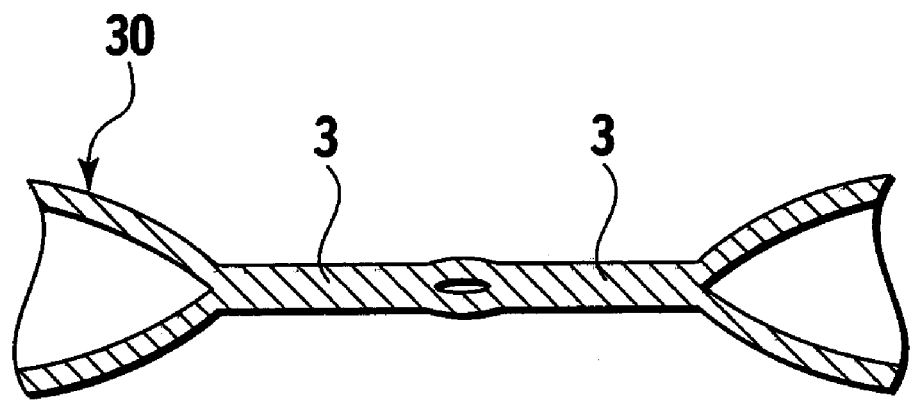

The tube welding unit 25 includes an up and down pair of welders 25a and 25b. Every time when the long-length tube 30 is fed at the predetermined pitch L by the first to third tube feeding units 22 and 24, the tube welding unit 25 implements the welding treatment for the long-length tube 30 by the pair of welding units 25a and 25b. By the welding treatment, as shown in FIGS. 6A and 6B, the hermetically sealed portions 3 and 3 are formed on two spots of the long-length tube 30, which are close to each other. As welding means, there are an ultrasonic wave, a hot wind, thermocompression bonding, and the like.

Figure 8:
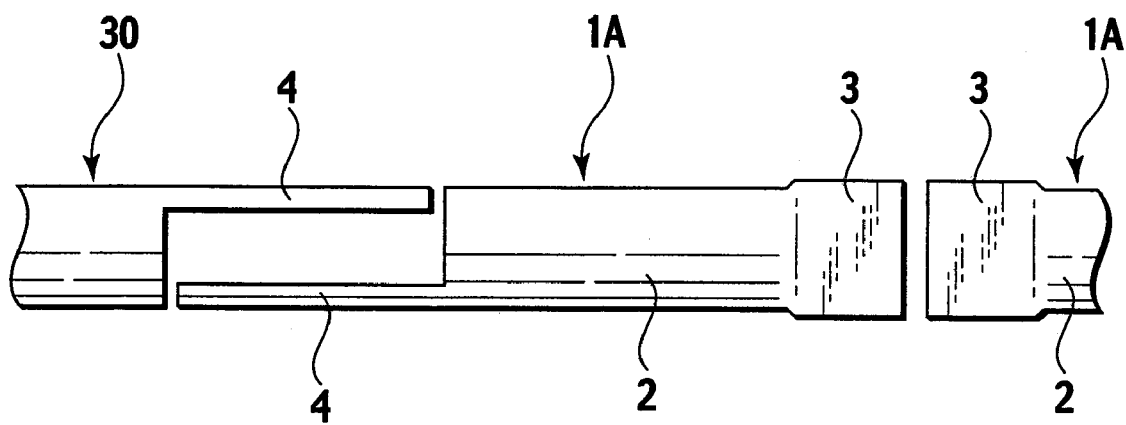
FIG. 8 is a plan view showing a spot of the long-length tube, which is subjected to a stamping process, showing the first embodiment of the present invention.

The tube cutting/stamping unit 26 includes: a lower pedestal 26a; an upper stamper 26b; and a cutter 2c. Every time when the long-length tube 30 is fed at the predetermined pitch L by the first to third tube feeding units 22 to 24, the tube cutting/stamping unit 26 simultaneously performs stamping of the long-length tube 30 by the stamper 26b and cutting of the long-length tube 30 by the cutter 26c. As shown in FIG. 8, the stamper 26b stamps the long-length tube 30 so as to form the two tongue portions 4 and 4 set at the positions opposed to each other. The cutter 26c cuts the long-length tube 30 at a position between the two hermetically sealed portions 3 and 3 close to each other.

Figure 7A:
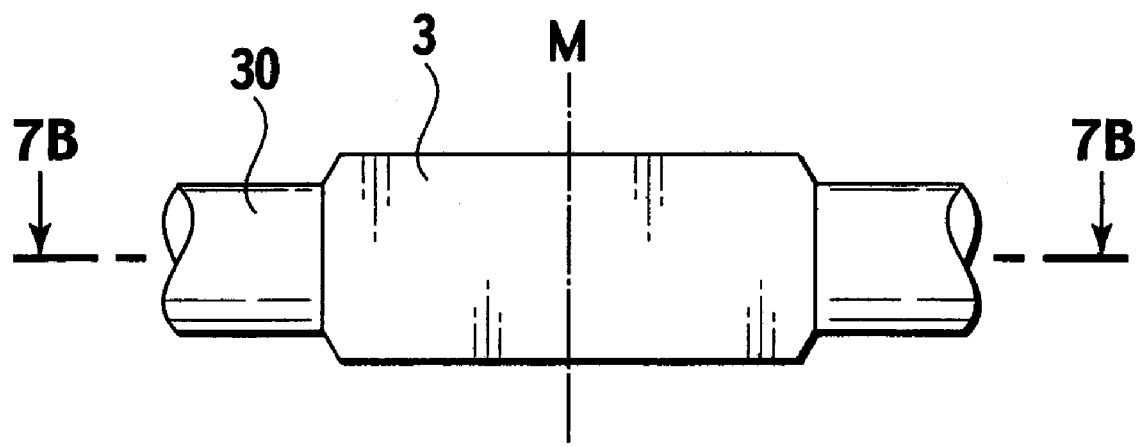
FIGS. 7A and 7B show another aspect of the first embodiment of the present invention.
Figure 7B:
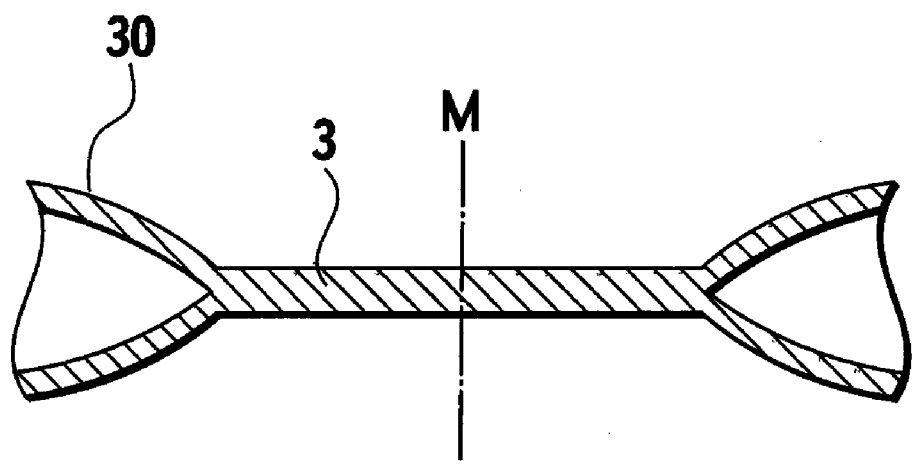

Note that, in this embodiment shown in FIGS. 5A and 5B and FIGS. 6A and 6B, a configuration is adopted, in which the two hermetically sealed portions 3 and 3 are formed by welding the two spots of the long-length tube 30, which are close to each other, and the spot between the hermetically sealed portions 3 and 3 is cut. However, a configuration may also be adopted, in which, as shown in FIGS. 7A and 7B, a large hermetically sealed portion 3 is formed on one spot of the long-length tube 30, and a center portion M of the hermetically sealed portion 3 is cut, whereby the two tongue portions 4 and 4 are formed.

Next, a description will be made of actions of the manufacturing apparatus 20. After conveying the long-length tube 30 at the predetermined pitch L, the first to third tube feeding units 22 to 24 stop conveying the long-length tube 30. When the conveying of the long-length tube 30 is stopped, the upper welder 25a of the tube welding unit 25 goes down until being attached with pressure onto the lower welder 25b, and implements the welding treatment for the long-length tube 30. By the welding treatment, as shown in FIGS. 5A and 5B, the hermetically sealed portions 3 and 3 are formed on the two spots of the long-length tube 30, which are close to each other. When the welding treatment is completed, the upper welder 25a goes up and returns to an original standby position thereof.

Moreover, simultaneously with the welding treatment by the tube welding unit 25, the upper stamper 26b and cutter 26c of the tube cutting/stamping unit 26 also go down to the lower pedestal 26a, and implement the stamping process and a cutting process for the long-length tube 30. The two tongue portions 4 and 4 are formed by the stamping process, and the hermetically sealed portions 3 and 3 close to each other are cut by the cutting process. When the cutting/stamping processes are completed, the upper stamper 26b and the cutter 26c go up and return to original standby positions thereof.

When the welding treatment and the cutting/stamping processes are completed, the first to third tube feeding units 22 to 24 convey the long-length tube 30 at the predetermined pitch L again, and then stop. Then, the above-described welding treatment and cutting/stamping processes are implemented again. Specifically, the conveying of the long-length tube 30 and such a set of the welding treatment and the cutting/stamping processes are repeated alternately, whereby the plurality of caps 1A shown in FIGS. 3A and 3B are sequentially manufactured from the long-length tube 30.

As above, in the present invention, the cap 1A is formed of the tube 2, in which one end side is made as the hermetically sealed portion 3 by the welding treatment, and the tongue portion 4 is formed by the stamping process on the other end side. Hence, the welding treatment and the cutting/stamping processes are implemented for the tube 30 formed by the extrusion molding, thus making it possible to fabricate the cap 1A. Therefore, in comparison with a cap formed by injection molding using a metal mold, good productivity is brought, and cost of equipment is saved. Moreover, the electric wire connecting portion 10 is inserted into the cap 1A, and the tongue portion 4 is bound with the plurality of electric wires W by the tape 11, whereby the work to cover the electric wire connecting portion 10 by the cap 1A is completed. From the above, cost of parts is low, and in addition, the work to cover the electric wire connecting portion 10 is simple.

In this first embodiment, the plurality of caps 1A are continuously fabricated from the long-length tube 30, the tongue portions 4 and 4 of the two caps 1A and 1A fabricated adjacent to each other are set at the positions opposed to each other along the longitudinal direction of the long-length tube 30, and both of the tongue portions 4 and 4 at the opposed positions are formed by the stamping process. Hence, a loss of the material of the plurality of caps 1A is saved when the caps 1A are fabricated from the long-length tube 30, and this contributes to reduction of the cost.

In this first embodiment, the cap 1A is manufactured by the welding step of forming the hermetically sealed portion 3 by implementing the welding treatment for the long-length tube 30 at the predetermined pitch L in the longitudinal direction thereof, and by the cutting/stamping process step of cutting the long-length tube 30 so that the hermetically sealed portion 3 can be one end of the cap 1A, and of implementing the stamping process for the long-length tube 30 in order to form the tongue portion 4 on the other end side of the cut tube 2. Hence, the plurality of caps 1A can be continuously fabricated from the long-length tube 30. Moreover, as the raw material of the cap 1A, the tube 30 formed by the extrusion molding can be used. Furthermore, the welding treatment and the stamping process are implemented for the tube 30, whereby each cap 1A is fabricated. Accordingly, in comparison with the cap formed by the injection molding using the metal mold, good productivity is brought, and the cost of the equipment is saved. Moreover, the electric wire connecting portion 10 is inserted into the cap 1A, and the tongue portion 4 is bound with the plurality of electric wires W by the tape 11, whereby the work to cover the electric wire connecting portion 10 by the cap 1A is completed. From the above, the cap 1A can be mass-produced, in which the cost of the parts is low, and in addition, the work to cover the electric wire connecting portion is simple.

In this first embodiment, the tongue portions 4 and 4 of the two caps 1A and 1A fabricated adjacent to each other from the long-length tube 30 are set in the same region with respect to the longitudinal direction of the long-length tube 30 and at the positions opposed to each other. In the welding step, the two spots of the long-length tube 30, which are close to each other, are welded simultaneously, whereby the hermetically sealed portions 3 and 3 are formed in the two spots close to each other. In the cutting/stamping process step, the spot between the hermetically sealed portions 3 and 3 in the two spots close to each other is cut, and the two tongue portions 4 and 4 set at the positions opposed to each other are stamped. In such a way, the cap 1A is manufactured. Hence, the two caps 1A and 1A can be fabricated simultaneously by the welding step and the cutting/stamping process step, each of which is implemented once. Accordingly, this leads to further enhancement of the productivity. Moreover, the loss of the material of the plurality of caps 1A is saved when the caps 1A are fabricated from the long-length tube 30, and this contributes to the reduction of the cost.

In this first embodiment, the welding step and the cutting/stamping process step are implemented simultaneously, and accordingly, the further enhancement of the productivity can be achieved.

Moreover, in comparison with an injection molding apparatus using the metal mold, it is possible to install the cap manufacturing apparatus 20 by the side of a production line for manufacturing the wire harness. Such installation of the cap manufacturing apparatus 20 by the side of the production line of the wire harness saves distribution cost, and in addition, makes it possible to manufacture just a required quantity of the caps 1A and to supply the manufactured caps 1A to the production line of the wire harness. Accordingly, inventory control and an inventory space can be suppressed to the minimum.

Figure 9:
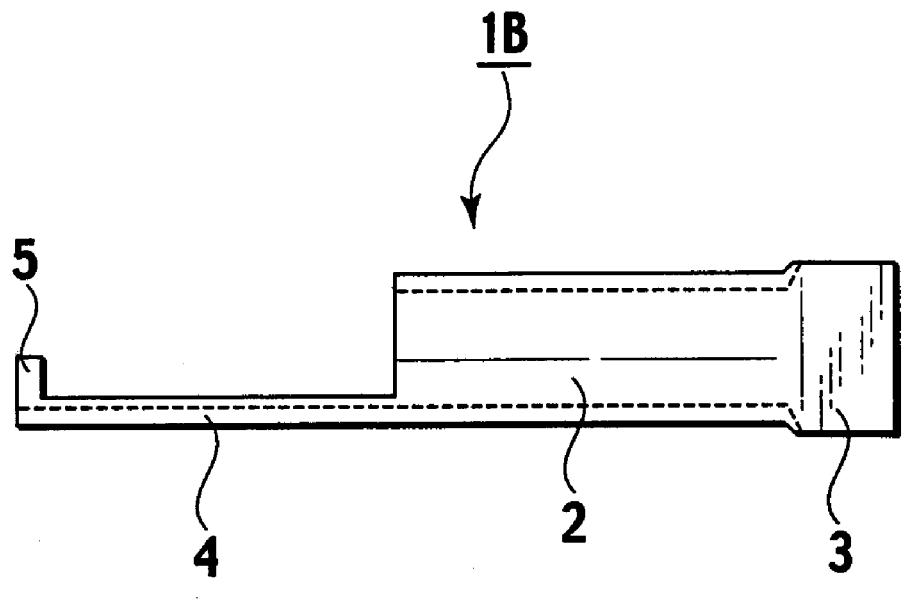
FIG. 9 is a plan view of a cap according to a second embodiment of the present invention.

FIG. 9 is a front view of a cap according to a second embodiment. In FIG. 9, in comparison with the cap 1A of the above-described first embodiment, the cap 1B of the second embodiment is different therefrom only in that a protruded portion 5 formed by the stamping process is attached onto the end of the tongue portion 4. Specifically, a stamped shape of such a cut/stamped portion of the first embodiment is partially changed, whereby the protruded portion 5 is formed on the end of the tongue portion 4.

Other configurations are similar to those of the above-described first embodiment. Accordingly, the same reference numerals are assigned to the same constituents in the drawing, and a description thereof is omitted.

In this second embodiment, the protruded portion 5 formed by the stamping process is provided on the end of the tongue portion 4. Hence, when external force to pull out the cap 1B from the electric wires is applied to the cap 1B, the protruded portion 5 of the tongue portion 4 increases frictional force with the electric wires, and accordingly, there is an advantage that the cap 1B is not detached easily.

Figure 10:
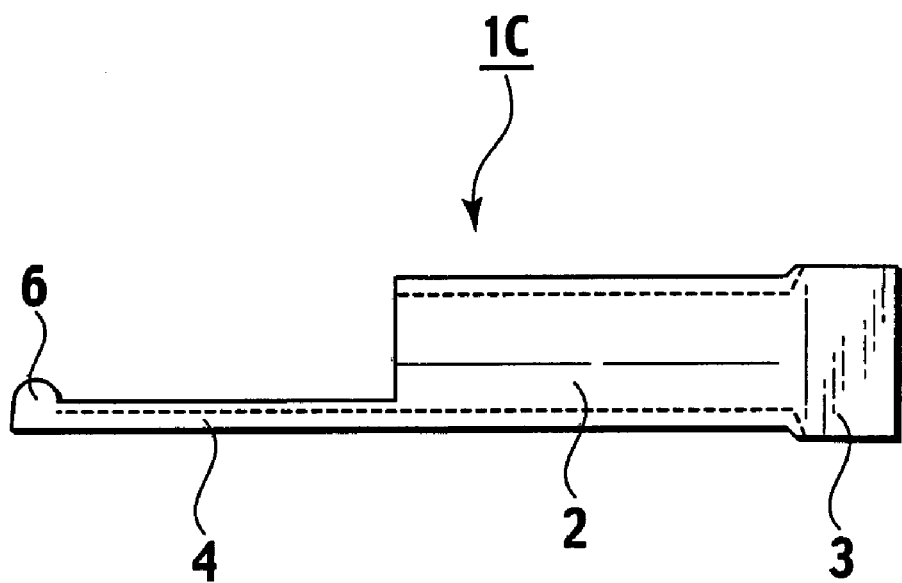
FIG. 10 is a plan view of a cap according to a third embodiment of the present invention.

FIG. 10 is a front view of a cap according to a third embodiment. In FIG. 10, in comparison with the cap 1A of the first embodiment, the cap 1C of the third embodiment is different therefrom only in that a protruded portion 6 formed by heating treatment is attached onto the end of the tongue portion 4. Specifically, the end of the tongue portion 4 of the cap fabricated by a similar manufacturing method to that of the first embodiment is heated by laser irradiation and the like, and the end is molten and solidified, whereby the protruded portion 6 is formed.

Other configurations are similar to those of the above-described first embodiment. Accordingly, the same reference numerals are assigned to the same constituents in the drawing, and a description thereof is omitted.

In this third embodiment, the protruded portion 6 formed by the heating treatment is provided on the end of the tongue portion 4. Hence, when external force to pull out the cap 1C from the electric wires is applied to the cap 1C, the protruded portion 6 of the tongue portion 4 increases frictional force with the electric wires, and the wound tape 11 gets snagged on the protruded portion 6. Accordingly, there is an advantage that the cap 1C is not detached easily.

What is claimed is:

1. An electric wire cap comprising:
   a tube having an open end and a closed end including radially-opposing portions of the tube in direct contact with and hermetically sealed to each other; and
   a tongue portion protruding from the open end of the tube.

2. The electric wire cap according to claim 1,
   wherein a plurality of the electric wire caps are fabricated from a long-length tube, the tongue portions of two caps fabricated adjacent to each other are set at positions opposed to each other along a longitudinal direction of the long-length tube, and both of the tongue portions set at the positions opposed to each other are formed by a stamping process.

3. The electric wire cap according to claim 1,
   wherein the tongue portion has a protruded portion extending inward toward a centerline of the tube and formed by a stamping process on an end of the tongue portion.

4. The electric wire cap according to claim 1,
   wherein the tongue portion has a protruded portion extending inward toward a centerline of the tube and formed by heating treatment on an end of the tongue portion.

5. The electric wire cap according to claim 1, wherein the tube has a generally hollow cylindrical structure that is flattened at the closed end, the flattened portion including the radially-opposing portions of the tube that are hermetically sealed to each other.

6. The electric wire structure according to claim 5,
   wherein the tongue potion has a protruded portion on an end of the tongue portion, which comes into contact with a bundle of the plurality of electric wires.

7. An electric wire structure, comprising:
   a plurality of electric wires that are bundled together;
   an electric wire cap that covers an electric wire connecting portion in which respective conductive portions of the plurality of the electric wires are interconnected, the electric wire cap comprising:
      a tube having an open end and a closed end including radially-opposing portions of the tube in direct contact with and hermetically sealed to each other;
      a tongue portion protruding from the open end of the tube; and
      a tape that binds the plurality of electric wires to the tongue portion.

* * * * *